72795 James W. Cahoon.
Impt. in Carts.
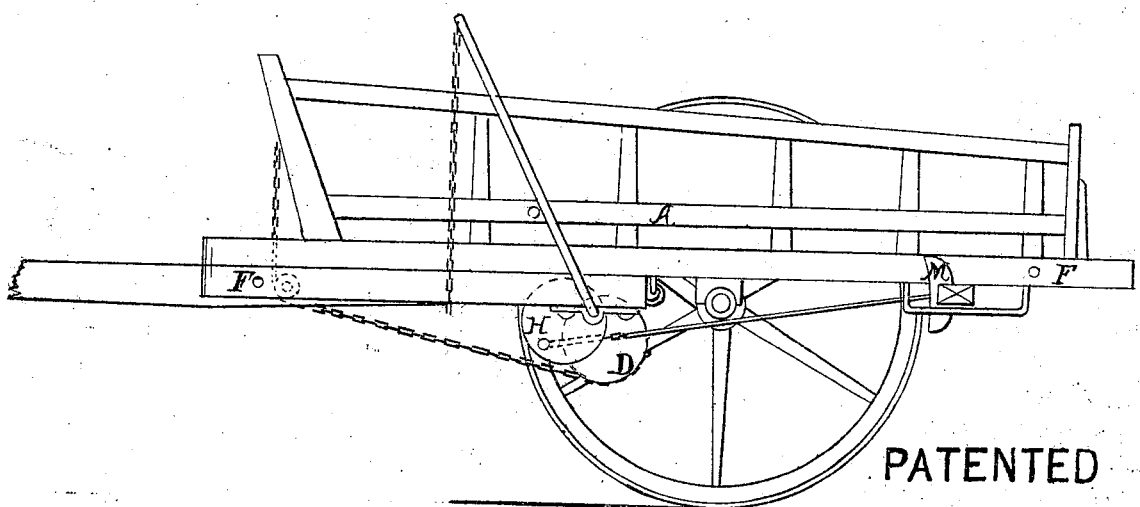
PATENTED
DEC 31 1867
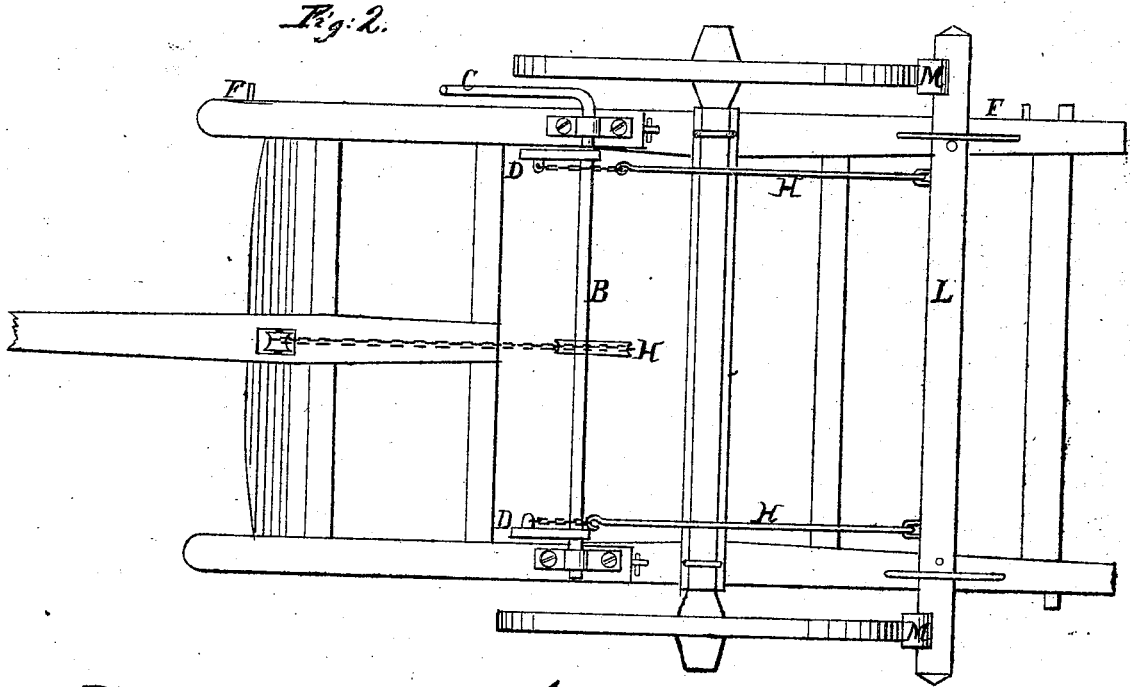

UNITED STATES PATENT OFFICE.

JAMES W. CAHOON, OF PHILADELPHIA, PENNSYLVANIA, ASSIGNOR TO BURGESS B. LONG, OF SAME PLACE.

IMPROVEMENT IN CARTS.

Specification forming part of Letters Patent No. 72,795, dated December 31, 1867.

*To all whom it may concern:*

Be it known that I, JAMES W. CAHOON, of the city and county of Philadelphia, and State of Pennsylvania, have invented certain Improvements in Carts; and I do hereby declare that the following, taken in connection with the drawings, which accompany and form part of this specification, is a description of my invention sufficient to enable those skilled in the art to practice it.

My improvements relate to devices for elevating the forward end of a laden cart, when descending a grade, in order to relieve the back of the beast, by throwing more of the load upon and back of the axle; and also to devices by which such apparatus is made to act connectedly and in unison with a brake upon the wheels.

They consist in providing beneath the body of the cart and forward of the axle a cross bar or shaft, on which fixed cams are secured, in such manner that, upon the turning of said bar or shaft in its bearings, the cams may be made to elevate the forward end of the cart to the height desired.

They further consist in a connection of the extreme forward end of the cart with another cam on the cam-shaft, in such manner that when the lifting-cams are turned down and locked in place, said cam secures and locks the body of the cart in its place.

They further consist in connecting and combining, for joint action, the lifting apparatus with a brake or brake-bar upon the wheels in such manner that the act of lifting the cart also puts the brake into action.

Figure 1 represents a cart with my improvements attached, one wheel being left off the better to display the devices beneath the cart. Fig. 2 represents the under side of the cart.

A is the cart, constructed in the usual manner. A bar or shaft, B, preferably of iron, is placed across the body of the cart, and underneath it, in any suitable bearings, and to it is a handle, C, acting as a lever for operating the same, as hereinafter described. Upon this shaft are rigidly secured two eccentrics or cams, D, which, when out of action, do not come in contact with the bottom of the body of the cart, but which, when caused partially to revolve by turning back the lever C, come into contact with the body at its opposite sides, and steadily and equally lift it proportionately to the extent of the distance that the lever is turned back. The degree to which the body may be lifted will be predetermined by the degree of eccentricity of the cams and their proximity to the bottom of the cart. To the handle C, at its outer end, I attach a chain, rod, or strap, the object of which is to hold the lever or handle C, and thereby the cams, in such position as may be desired, pins or hooks, F, serving as the means by which such chain, rod, or strap may be fastened. From the central cam H, whose eccentrical or cam side should be, relatively to the axis, in a direction opposite that of the cams D D, a chain or strap passes forward and upward, its other end being secured to the front of the cart. This chain should be fastened upon the periphery of the cam and lie in a groove therein, and it may pass over a guide-roller located at any convenient point. From the sides or faces of the cams D D are connected, by chains, links, or otherwise, rods K K, whose other ends are connected to a brake-bar, L, carrying brakes M, which are designed to act against the wheels. This bar is supported in loops or in any other equivalent manner, so that it may be free to slide to or from the wheels, as occasion may demand.

The details may be varied without departing from my invention. For instance, the handle C may be made in one piece of metal with the bar or shaft B, or may be made separate and attached in any ordinary manner. The cams D D may be of different form from those shown, or differently located. The cam H might be dispensed with, and an arm projecting from the shaft B be substituted for it; but I prefer the eccentric or cam, because if made of the proper size, relatively to the other cams, the action of the several cams will be equal, and the slack of the center chain or strap will be all taken up when the front of the cart is down, and the strap then acts as a lock to hold it down firmly. When, however, the cart is tilted by the cams, their partial revolution about their axes lets out just enough of the chain, and no more, to restrain the cart from tilting a particle beyond that point to which the cams may have raised it. The brake, also, may be made in any well-known manner, and it may act upon both or only one wheel, as may be desired; but I prefer to construct it substantially as shown.

The act of raising the forward end of the cart by means of the cams will, of necessity, it will be now perceived, also draw the brake against the wheels, so that, descending a hill, one action of the teamster effects two most important results: the throwing much of the weight off the animal's back and the putting on of the brakes, while the degree to which it is done will coincide, a slight tilting effecting a slight drag or friction of the brake, and an extreme tilting a correspondingly heavy drag.

I claim—

1. The employment of lifting-cams or eccentrics to elevate the forward end of a vehicle, substantially as and for the purpose described.

2. A locking-device for the forward end of a cart or other vehicle, a cam or eccentric, and a connecting rod or strap, substantially as shown and described.

3. The combination with a cart-tilting device, substantially such as shown and described, of a brake, as and for the purpose set forth.

JAS. W. CAHOON.

Witnesses:
 W. P. HIBBARD,
 WM. J. LAMPAS.